(12) United States Patent
Herzog et al.

(10) Patent No.: US 9,701,809 B2
(45) Date of Patent: Jul. 11, 2017

(54) RUBBER MIXTURE AND VEHICLE TIRE

(71) Applicant: Continental Reifen Deutschland GmbH, Hannover (DE)

(72) Inventors: Katharina Herzog, Harsum (DE); Carla Recker, Hannover (DE); Julia Grosse, Seelze (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/185,485

(22) Filed: Jun. 17, 2016

(65) Prior Publication Data

US 2016/0297948 A1    Oct. 13, 2016

Related U.S. Application Data

(63) Continuation of application No. PCT/EP2014/075750, filed on Nov. 27, 2014.

(30) Foreign Application Priority Data

Dec. 20, 2013    (EP) ..................................... 13198705

(51) Int. Cl.
| | |
|---|---|
| C08K 3/36 | (2006.01) |
| C08L 9/06 | (2006.01) |
| C08F 297/04 | (2006.01) |
| C08F 236/06 | (2006.01) |
| C08F 236/10 | (2006.01) |
| C08L 9/00 | (2006.01) |
| B29B 7/74 | (2006.01) |

(52) U.S. Cl.
CPC .............. *C08K 3/36* (2013.01); *B29B 7/7495* (2013.01); *C08F 236/06* (2013.01); *C08F 236/10* (2013.01); *C08F 297/042* (2013.01); *C08L 9/00* (2013.01); *C08L 9/06* (2013.01)

(58) Field of Classification Search
None
See application file for complete search history.

(56) References Cited

U.S. PATENT DOCUMENTS

| | | | |
|---|---|---|---|
| 4,182,818 A | 1/1980 | Tung et al. | |
| 4,196,153 A | 4/1980 | Tung et al. | |
| 5,521,255 A | 5/1996 | Roy | |
| 5,561,210 A | 10/1996 | Roy | |
| 7,968,633 B2 | 6/2011 | York et al. | |
| 7,968,634 B2 | 6/2011 | York et al. | |
| 7,968,635 B2 | 6/2011 | York et al. | |
| 7,968,636 B2 | 6/2011 | York et al. | |
| 8,362,181 B2 * | 1/2013 | Hogan ...................... | B60C 1/00 525/102 |
| 8,445,580 B2 | 5/2013 | Zhao | |
| 8,604,136 B2 | 12/2013 | Lohse et al. | |
| 2009/0312449 A1 * | 12/2009 | Sasaki ...................... | A43B 3/00 521/148 |
| 2015/0210791 A1 | 7/2015 | Ruehmer et al. | |

FOREIGN PATENT DOCUMENTS

| | | | | |
|---|---|---|---|---|
| CH | WO 2015090447 A1 * | 6/2015 | ............... | B60C 1/00 |
| EP | 0 316 857 A2 | 5/1989 | | |
| EP | 0 413 294 A2 | 2/1991 | | |
| EP | 0 502 728 A1 | 9/1992 | | |
| EP | 2 530 095 A1 | 12/2012 | | |
| KR | 20000019410 A | 4/2000 | | |
| WO | 99/09036 A1 | 2/1999 | | |
| WO | 2010/059402 A1 | 5/2010 | | |
| WO | 2013/127448 A1 | 9/2013 | | |

OTHER PUBLICATIONS

Tanaka, Y. et al, "Determination of sequence length distribution in SBR by ozonolysis-g.p.c. method", Polymer, 1981, vol. 22, December, pp. 1721 to 1723, IPC Business Press.
Written Opinion of the International Searching Authority and English-language translation thereof in PCT/EP2014/075750, mailed Mar. 6, 2015.
International Search Report dated Mar. 6, 2015 of international application PCT/EP2014/075750 on which this application is based.

* cited by examiner

*Primary Examiner* — Vickey Nerangis
(74) *Attorney, Agent, or Firm* — Walter Ottesen, P.A.

(57) ABSTRACT

A rubber mixture for vehicle tires which exhibits improved rolling resistance behavior and improved wear properties. The rubber mixture includes: 5 to 100 phr of at least one polymer A of the formula I): 1) $F-(P-Y-P-S_x)_z-P-Y-P-F$, wherein S is sulfur, P is an elastomer polymer chain obtained by the anionic polymerization of a conjugated diene and, optionally, a vinyl aromatic compound in the presence of a diinitiator, Y is a dicarbanion group derived from the diinitiator, x is an integer greater than or equal to 1 independently for each $S_x$ group, on the condition that x is selected from the numbers 2, 3, and 4 for at least one Sx group, z is an integer from 1 to 160, each F is a terminal group independently selected from —H, —SH, —SOH, —SCl, —SO$_2$H and —SO$_3$H, and at least one filler.

10 Claims, No Drawings

RUBBER MIXTURE AND VEHICLE TIRE

CROSS REFERENCE TO RELATED APPLICATIONS

This application is a continuation application of international patent application PCT/EP2014/075750, filed Nov. 27, 2014, designating the United States and claiming priority from European application 13198705.9, filed Dec. 20, 2013, and the entire content of both applications is incorporated herein by reference.

FIELD OF THE INVENTION

The disclosure relates to a rubber mixture, in particular for vehicle tires, and a vehicle tire.

BACKGROUND OF THE INVENTION

The rubber compositions of the individual components of vehicle tires, in particular the composition of the tread, determine the traveling properties thereof to a high degree. For the purposes of the present text, the term vehicle tires encompasses pneumatic vehicle tires, solid rubber tires and two-wheel tires.

To influence the mixing and vulcanization properties, a very wide variety of additives are mixed into the mixtures and/or specific polymers are used. As additives, mention may be made by way of example at this point of fillers (for example, carbon black), plasticizers, aging inhibitors and crosslinking systems composed of sulfur, accelerator and activator.

Crosslinking of the polymer chains by means of the vulcanization system produces a three-dimensional widemeshed chemical network, as a result of which the rubber mixture becomes, depending on the crosslinking density, for example harder and more resistant to cracking, in particular because of an increased tear propagation resistance.

Crosslinking results in formation of network nodes at which the polymer chains are linked to one another, usually via bridges, for example, sulfur bridges in the case of sulfur crosslinking of diene rubbers. The length of the sulfur bridges, that is, the number of S atoms per crosslinking bridge, depends on the ratio of sulfur to accelerator, with a distinction generally being made between a conventional network (sulfur/accelerator ratio of from 10:1 to 2:1), a semiefficient network (sulfur/accelerator ratio of from 2:1 to 1:2) and an efficient network (sulfur/accelerator ratio of from 1:2 to 1:10).

In sulfur crosslinking, the polymer chains are linked to one another via sulfur bridges in such a way that many free chain ends are present. These free polymer chain ends are particularly mobile and can absorb energy and convert it into kinetic energy. The rubber mixture therefore acts in an energy-damping manner, which has an adverse effect on the rolling resistance when used, for example, in vehicle tires.

SUMMARY OF THE INVENTION

It is therefore an object of the disclosure to provide a rubber mixture, in particular for vehicle tires, which displays a further improvement in the rolling resistance behavior and in the abrasion behavior, with the further properties, in particular the wet grip properties, remaining at the same level.

This object is achieved by a rubber mixture which contains at least the following constituents:

from 5 to 100 phr of at least one polymer A of the formula I) below:

$$F\text{-}(P\text{-}Y\text{-}P\text{-}S_x)_z\text{-}P\text{-}Y\text{-}P\text{-}F \qquad \text{I)}$$

where
S is a sulfur atom, and
P is an elastomeric polymer chain which has been obtained by anionic polymerization of at least one conjugated diene and optionally at least one vinylaromatic compound in the presence of a diinitiator, and
Y is a dicarbanion group derived from the diinitiator, and
x is independently for each Sx group an integer equal to or greater than 1, with the proviso that x is selected from among the numbers 2, 3, and 4 for at least one $S_x$ group, and
z is an integer from 1 to 160, and
each F is independently an end group selected from the group consisting of —H, —SH, —SOH, —SCl, —SSCl, —SO₂H, and —SO₃H, and
at least one filler.

It has surprisingly been found that the abrasion properties and the rolling resistance behavior of the rubber mixture are improved by means of at least one polymer A of the above type in combination with at least one filler.

At the same time, the other tire properties remain at approximately the same high level or are even improved, with, in particular, the wet grip behavior and/or the tearing properties and/or the dry braking behavior of the rubber mixture remaining at approximately the same high level or even being improved.

Preferably, the rubber mixture contains at least one filler. Such fillers can be all fillers conceivable in the rubber industry, for example, carbon black or silica or other polar fillers such as aluminosilicates, chalk, starch, magnesium oxide, titanium dioxide or rubber gels.

The filler is preferably at least one silica and/or at least one carbon black.

The silica can be a type of silica which is known to those skilled in the art and is suitable as filler for tire rubber mixtures. However, particular preference is given to using a finely divided, precipitated silica which has a nitrogen surface area (BET surface area) (in accordance with DIN ISO 9277 and DIN 66132) of from 35 to 350 m²/g, preferably from 35 to 260 m²/g, particularly preferably from 100 to 260 m²/g and very particularly preferably from 130 to 235 m²/g, and a CTAB surface area (in accordance with ASTM D 3765) of from 30 to 400 m²/g, preferably from 30 to 250 m²/g, particularly preferably from 100 to 250 m²/g and very particularly preferably from 110 to 230 m²/g. Such silicas lead, for example in rubber mixtures for tire treads, to particularly good physical properties of the vulcanizates. In addition, advantages can arise in processing of the mixture as a result of a reduction in the mixing time while maintaining the same product properties, which properties lead to an improved productivity. As silicas, it is possible to use, for example, both any silica of the Ultrasil® VN3 type (tradename) from Evonik and highly dispersible silicas known as HD silicas (for example, Zeosil® 1165 MP from Rhodia).

The filler is particularly preferably at least one silica.

A coupling agent in the form of silane or a silicon-organic compound is preferably used. Here, it is possible to use one or more different silane coupling agents in combination with one another. The rubber mixture can thus contain a mixture of various silanes.

The silane coupling agents react with the surface silanol groups of the silica or other polar groups during mixing of the rubber or of the rubber mixture (in situ) or in a pretreatment (premodification) even before addition of the filler to the rubber. As silane coupling agents, it is possible to use all silane coupling agents which are known to those skilled in the art for use in rubber mixtures. Such coupling agents known from the prior art are bifunctional organosilanes which have at least one alkoxy, cycloalkoxy or phenoxy group as leaving group on the silicon atom and have, as other function, a group which can, optionally after dissociation, undergo a chemical reaction with the double bonds of the polymer. The latter group can be, for example, one of the following chemical groups:

—SCN, —SH, —NH$_2$ or —S$_x$— (where x=2 to 8).

Thus, for example, 3-mercaptopropyltriethoxysilane, 3-thiocyanatopropyltrimethoxysilane or 3,3'-bis(triethoxysilylpropyl) polysulfides having from 2 to 8 sulfur atoms, for example, 3,3'-bis(triethoxysilylpropyl) tetrasulfide (TESPT), the corresponding disulfide (TESPD), or else mixtures of the sulfides having from 1 to 8 sulfur atoms and different contents of the various sulfides can be used as silane coupling agents. TESPT can, for example, also be added as a mixture with industrial carbon black (tradename X50S® from Evonik).

Preference is given to using a silane mixture which contains from 40 to 100% by weight of disulfides, particularly preferably from 55 to 85% by weight of disulfides and very particularly preferably from 60 to 80% by weight of disulfides.

Blocked mercaptosilanes, as are known, for example, from WO 99/09036, can also be used as silane coupling agent. Silanes as are described in U.S. Pat. Nos. 7,968,633; 7,968,636; 7,968,635; and, 7,968,634 can also be used. It is also possible to use, for example, silanes which are marketed under the name NXT in a number of variants from Momentive, USA, or those which are marketed under the name VP Si 363® by Evonik Industries.

The amount of coupling agent is preferably from 0.1 to 20 phf, particularly preferably from 1 to 15 phf.

The expression phf (parts per hundred parts of filler by weight) used in this text is the conventional unit for amount of coupling agents for fillers in the rubber industry. For the purposes of the present patent application, phf relates to the silica present, that is, other fillers which are possibly present, for example, carbon black, are not included in the calculation of the amount of silane.

Possible carbon blacks are all types of carbon black known to a person of ordinary skill in the art.

In one embodiment, the carbon black has an iodine number determined in accordance with ASTM D 1510, which is also referred to as iodine adsorption number, in the range from 30 g/kg to 250 g/kg, preferably from 30 to 180 g/kg, particularly preferably from 40 to 180 g/kg, and very particularly preferably from 40 to 130 g/kg, and a DBP number in accordance with ASTM D 2414 of from 60 to 200 ml/100 g, preferably from 70 to 200 ml/100 g, particularly preferably from 90 to 200 ml/100 g.

The DBP number in accordance with ASTM D 2414 determines the specific absorption volume of a carbon black or a light-colored filler by means of dibutyl phthalate.

The use of such a type of carbon black in the rubber mixture, in particular for vehicle tires, ensures the best possible compromise between abrasion resistance and heat buildup, which in turn influences the ecologically relevant rolling resistance. Preference is given here to only one type of carbon black being used in the respective rubber mixture, but it is also possible to mix various types of carbon black into the rubber mixture.

The filler in the rubber mixture of the invention is particularly preferably at least one silica, with one or more different silicas having the abovementioned features being conceivable.

In an advantageous embodiment of the invention, the rubber mixture does not contain any further filler in addition to one or more silica(s).

It is also conceivable for the rubber mixture to contain carbon nanotubes (CNT) including discrete CNTs, known as hollow carbon fibers (HCF), and modified CNT containing one or more functional groups such as hydroxy, carboxy and carbonyl groups).

Graphite and graphenes and also "carbon-silica dual-phase filler" are also conceivable as filler.

The rubber mixture of the invention contains from 0 to 300 phr, preferably from 20 to 300 phr, particularly preferably from 20 to 150 phr and very particularly preferably from 80 to 110 phr, of at least one silica.

The rubber mixture of the invention contains from 0 to 200 phr of at least one carbon black, preferably from 0 to 150 phr, particularly preferably from 0 to 100 phr.

In an advantageous embodiment, the rubber mixture contains 0 phr of carbon black, that is, it is free of carbon black.

In a further advantageous embodiment of the invention, the rubber mixture contains from 0.1 to 200 phr, preferably from 0.1 to 150 phr, particularly preferably from 0.1 to 100 phr, very particularly preferably from 5 to 100 phr, of at least one carbon black.

Preferably, the rubber mixture contains from 5 to 100 phr of at least one polymer A of the formula I) below:

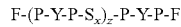

F-(P-Y-P-S$_x$)$_z$-P-Y-P-F    I)

where
S is a sulfur atom, and
P is an elastomeric polymer chain which has been obtained by anionic polymerization of at least one conjugated diene and optionally at least one vinylaromatic compound in the presence of a diinitiator, and
Y is a dicarbanion group which is derived from the diinitiator, and
x is independently for each S$_x$ group an integer equal to or greater than 1, with the proviso that x is selected from among the numbers 2, 3, and 4 for at least one S$_x$ group, and
z is an integer from 1 to 160, and
each F is independently an end group selected from the group consisting of —H, —SH, —SOH, —SCl, —SSCl, —SO$_2$H, and —SO$_3$H.

The polymer A is thus a polymer which is sulfur-modified within the chains. Here, it is important that the S$_x$ group(s) is/are incorporated into the chain of the formula I).

For the purposes of the present invention, "polymer A" is a polymer of the above-described formula I) having the above-described features including the embodiments mentioned below.

The rubber mixture of the invention is crosslinked during the vulcanization. Here, the polymer chains open at and/or within the S$_x$ groups, so that polymer sections P having vulcanizable end groups are formally formed during the vulcanization. The formation of a trifunctional network node is thus conceivable in the reaction of a chain end with a double bond of the diene rubber.

It has been found that the rubber mixture of the invention has improved rolling resistance indicators compared to the prior art. It is therefore assumed that free chain ends are formed only to a minor extent or not at all in the case of this network structure, unlike the crosslinking of polymers known in the prior art. Free chain ends can convert absorbed energy into kinetic energy, so that rubber mixtures having many free chain ends of the crosslinked polymers display high damping behavior and thus a disadvantageous rolling resistance behavior. Virtually no free chain ends remain in the rubber mixture of the invention after vulcanization because of the polymer A, so that the rubber mixture of the invention has an improved rolling resistance behavior.

Furthermore, polymers A of the formula I) are polymer chains bound linearly to one another via sulfur, as a result of which the number of free chain ends is likewise reduced compared to the prior art. In sulfur vulcanization according to the prior art using free sulfur, four polymer chains are usually bound to a sulfur network node in the middle of the chain, that is, not at the chain end, and four free chain ends are thus present.

The polymer A present in the rubber mixture contains, as shown in formula I), polymer chains P. These have been obtained by anionic polymerization of at least one conjugated diene and optionally at least one vinylaromatic compound in the presence of a diinitiator. The resulting living anionic polymer chains have been reacted with disulfur chloride $S_2Cl_2$. The sulfur-modified polymers of the formula I) have been formed in this way.

The at least one conjugated diene can be any conjugated diene known to those skilled in the art. The conjugated diene is preferably selected from the group consisting of 1,3-butadiene and 2-($C_1$-$C_5$-alkyl)-1,3-butadiene and 2,3-dimethyl-1,3-butadiene and 1,3-pentadiene and 2,4-hexadiene and 1,3-hexadiene and 1,3-heptadiene and 1,3-octadiene and 2-methyl-2,4-pentadiene and cyclopentadiene and 2,4-hexadiene and 1,3-cyclooctadiene. It is conceivable for one or two or more of the conjugated dienes mentioned to be used in a admixture with one another.

An example of a 2-($C_1$-$C_5$-alkyl)-1,3-butadiene is isoprene (2-methyl-1,3-butadiene).

The conjugated diene is particularly preferably selected from the group consisting of 1,3-butadiene and isoprene and 2,3-dimethyl-1,3-butadiene and 1,3-pentadiene and 2,4-hexadiene and 1,3-hexadiene and 1,3-heptadiene and 1,3-octadiene and 2-methyl-2,4-pentadiene and cyclopentadiene and 2,4-hexadiene and 1,3-cyclooctadiene.

The at least one conjugated diene is very particularly preferably isoprene and/or 1,3-butadiene.

In a preferred embodiment, the conjugated diene is 1,3-butadiene. In another preferred embodiment, the polymer chains have been formed by polymerization of 1,3-butadiene without further conjugated dienes and without a vinylaromatic compound, and are thus chains of butadiene rubber (BR).

For the purposes of the present disclosure, the term "vinylaromatic compound" encompasses monovinylaromatic compounds, that is, compounds in which only one vinyl group is bound to an aromatic group, and vinylaromatic compounds in which two or more vinyl groups are bound to an aromatic group.

According to the abovementioned formula I), the polymer chains P can optionally contain at least one vinylaromatic monomer.

Any vinylaromatic compound known to those skilled in the art is conceivable as vinylaromatic compound. The vinylaromatic compound is preferably selected from the group consisting of styrene, $C_{1-4}$-alkyl-substituted styrenes, stilbene, vinylbenzyldimethylamine, 4-vinylbenzyl dimethylaminoethyl ether, N,N-dimethylaminoethylstyrene, tert-butoxystyrene, vinylpyridine, and divinylaromatic compounds.

The $C_{1-4}$-alkyl-substituted styrenes can be, for example, 2-methylstyrene and/or 3-methylstyrene and/or 4-methylstyrene and/or 2,4-dimethylstyrene and/or 2,4,6-trimethylstyrene and/or alpha-methylstyrene and/or 2,4-diisopropylstyrene and/or 4-tert-butylstyrene.

The divinylaromatic compounds can be, for example, 1,2-divinylbenzene and/or 1,3-divinylbenzene and/or 1,4-divinylbenzene.

It is conceivable for one or two or more vinylaromatic compounds to be used in admixture with one another.

The vinylaromatic compound is preferably selected from the group consisting of styrene, 2-methylstyrene, 3-methylstyrene and 4-methylstyrene and 2,4-dimethylstyrene, 2,4,6-trimethylstyrene, alpha-methylstyrene, 2,4-diisopropylstyrene, 4-tert-butylstyrene, stilbene, vinylbenzyldimethylamine, 4-vinylbenzyl dimethylaminoethyl ether, N,N-dimethylaminoethylstyrene, tert-butoxystyrene, vinylpyridine, 1,2-divinylbenzene, 1,3-divinylbenzene, and 1,4-divinylbenzene.

In a preferred embodiment, the polymer chains P are obtained by anionic polymerization of at least one conjugated diene and at least one vinylaromatic compound in the presence of a diinitiator.

The vinylaromatic compound is particularly preferably styrene.

In a preferred embodiment, the elastomeric polymer chains P have been formed by anionic polymerization of at least 1,3-butadiene and styrene. It is conceivable here for a third or further monomer(s) to be present in the polymer chains P.

In a particularly preferred embodiment, the elastomeric polymer chains P have been formed by anionic polymerization of 1,3-butadiene and styrene.

In this particularly preferred embodiment, the polymer A is thus a sulfur-modified styrene-butadiene rubber of the formula II).

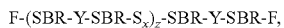

$$F\text{-}(SBR\text{-}Y\text{-}SBR\text{-}S_x)_z\text{-}SBR\text{-}Y\text{-}SBR\text{-}F, \qquad \text{II)}$$

where SBR is an elastomeric polymer chain which has been obtained by anionic polymerization of 1,3-butadiene and styrene in the presence of a diinitiator, and all other groups and parameters are as defined above for formula I).

The styrene content of the polymer A of the formula II) is preferably from 5 to 70% by weight, particularly preferably from 5 to 60% by weight, and very particularly preferably from 5 to 50% by weight, based on the total mass of the polymer.

Less than 5% by weight of styrene in the rubber mixture leads to a poorer balance between the indicators for rolling resistance, wet grip, and abrasion resistance and to a reduced tensile strength. More than 70% by weight of styrene has an adverse effect on the hysteresis loss.

A polymer A of the formula II) in the rubber mixture makes it particularly readily possible, especially by use in the tread, to achieve a further improvement in the rolling resistance and the abrasion resistance of vehicle tires based on the prior art without the other tire properties being adversely affected.

The SBR units of the polymer A of the formula II) can be block copolymers or random copolymers. Preference is given to 40% by weight or more of the styrene monomers being individually linked, while 10% by weight or less are present in blocks of eight or more adjoining styrene monomers. A polymer which is outside these limits can display an increased hysteresis loss. The length of the styrene units linked to one another is determined by means of ozonolysisgel permeation chromatography, as described in Tanaka et al., Polymer, Vol. 22, pages 1721-1723, 1981.

The vinyl content of the polymer A of the formula I) including the embodiment of the formula II) is preferably from 2 to 90% by weight, particularly preferably from 5 to 75% by weight, based on the amount of conjugated diene, for example, the amount of butadiene, in the polymer.

A vinyl content of less than 2% by weight in the rubber mixture leads to a poorer balance between the indicators for rolling resistance, wet grip and abrasion resistance and to a reduced tensile strength. A vinyl content of more than 90% by weight has an adverse effect on the tensile strength, the abrasion resistance and the hysteresis loss.

In an advantageous embodiment, the polymer A of the formula I) including the embodiment of the formula II) has a glass transition temperature $T_g$ of from −100 to 0° C., preferably from −85 to 0° C., before vulcanization of the rubber mixture. The $T_g$ of the polymer A is particularly preferably from −30 to 0° C., very particularly preferably from −30 to −10° C., before vulcanization.

The polymerization by means of which the polymer chains P have been obtained is preferably a solution polymerization. The sulfur-modified polymer A of the formula II) is thus preferably a sulfur-modified SSBR.

The type of work-up after the reaction of the polymer chains with $S_2Cl_2$ determines the type of end groups F in the formula I) including the embodiment of the formula II) of the polymer A. An anionic polymer chain end which has not reacted with $S_2Cl_2$ and has been protonated during the work-up bears a hydrogen atom, —H, as end group. A polymer chain end which has reacted with $S_2Cl_2$ without further linking to another living anionic polymer chain bears —SSCl or derivatives or further reaction products, in particular oxidation products, of $S_2Cl_2$, for example, —SH, —SOH, —SCl, —SO$_2$H or —SO$_3$H, as end group.

The diinitiator used in the polymerization of, for example, 1,3 butadiene and styrene can be any compound which is known to those skilled in the art and has the effect of acting as initiator in the polymerization and provides at least two carbanions, that is, for example, a dicarbanion, per (initiator) molecule in the polymerization. The diinitiator is preferably an organolithium compound. Conceivable diinitiators are, for example, described in the following documents: EP 0 316 857, EP 0 413 294, U.S. Pat. No. 4,182,818, U.S. Pat. No. 4,196,153, U.S. Pat. No. 5,561,210, U.S. Pat. No. 5,521,255 and U.S. Pat. No. 8,604,136. Such diinitiators are, for example:

1,3-phenylenebis(3-methyl-1-phenylpentylidene)bislithium, 1,3-phenylenebis(3-methyl-1-(4-methyl)phenylpentylidene) bislithium, 1,3-phenylenebis(3-methyl-1-(4-ethyl)phenylpentylidene) bislithium, 1,3-phenylenebis(3-methyl-1-(4-(1,1-dimethyl)ethyl)phenyl-pentylidene)bislithium, 1,3-phenylenebis(3-methyl-1-(4-dodecyl)phenylpentylidene) bislithium, 1,3-phenylenebis(3-methyl-1-(1-methyl)phenylpentylidene) bislithium, 1,4-phenylenebis(3-methyl-1-phenylpentylidene)bislithium.

In a preferred embodiment, the diinitiator is 1,3 phenylenebis(3-methyl-1-(4-methyl)phenylpentylidene) bislithium and thus has the structural formula II) below

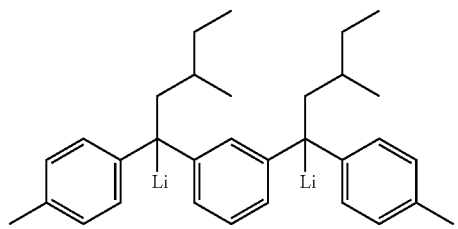

This means that, in this embodiment, Y in the formula I) including the embodiment of the formula II) of the polymer A is the dicarbanion 1,3-phenylenebis(3-methyl-1-(4-methyl)phenylpentylidene)$^{2-}$.

It is also conceivable for the diinitiator to be used in combination with at least one further initiator. The further initiator is preferably an organolithium compound, for example ethyllithium, propyllithium, n-butyllithium, sec-butyllithium, tert-butyllithium, phenyllithium, hexyllithium, 1,4-dilithio-n-butane, 1,3-di(2-lithio-2-hexyl)benzene and 1,3-di(2-lithio-2-propyl)benzene. Particular preference is given to using n-butyllithium and/or sec-butyllithium as further initiator.

The polymer A contains, as can be seen from the formulae I) and II) depicted above, a plurality of sulfur atoms in the $S_x$ groups within the polymer chains. The polymer A of the formula I) including the embodiment of the formula II) contains sulfur in amounts of from 0.1 to 30 g per kg of polymer (g/kg of polymer, for short), preferably from 0.1 to 10 g/kg of polymer and particularly preferably from 0.5 to 3 g/kg of polymer and very particularly preferably from 2 to 3 g/kg of polymer.

The determination of the sulfur content is carried out by means of X-ray fluorescence spectrometry (Axios spectrometer, PANalytical; data analysis by means of the software PCFPW, from Fundex; sample preparation in a hot press and then immediate measurement)

According to formula I), z is an integer from 1 to 160. z is preferably an integer from 1 to 80 and particularly preferably from 1 to 40.

In a preferred embodiment, z is at least 2, so that at least two $S_x$ groups are present in the polymer.

According to the formula I) including the embodiment of the formula II), x is independently for each $S_x$ group an integer equal to or greater than 1, with the proviso that x is selected from among the numbers 2, 3, and 4 for at least one $S_x$ group.

In a preferred embodiment, x is an integer from 1 to 8, particularly preferably from 1 to 6, very particularly preferably from 1 to 4, with the proviso that x is selected from the numbers 2, 3, and 4 for at least one $S_x$ group.

In a particularly preferred embodiment, z is an integer from 1 to 40 and x is an integer from 1 to 4, with the proviso that x is selected from the numbers 2, 3, and 4 for at least one $S_x$ group.

The average molecular weight ($M_w$) of the sulfur-containing polymer A of the formula I) including the embodiment of the formula II) is from 5 to 2000 kg/mol, preferably from 10 to 1500 kg/mol and particularly preferably from 15 to 1000 kg/mol.

The determination of the molecular weight (weight average $M_w$ and number average $M_n$) of the polymer is carried out by means of gel permeation chromatography (GPC) using tetrahydrofuran (THF) as eluent at 40° C., calibrated by means of polystyrene standard EasiCal PS-1; size exclusion chromatography (SEC); sample preparation: from 9 to 11 mg of dried polymer having a moisture content of <0.6% are dissolved in 10 ml of THF by shaking for 20 minutes, the polymer solution is subsequently transferred through a disposable 0.45 μm filter into a 2 ml ampoule, measurement in the GPC at an elution rate of 1 ml/min, injection volume 100 μl, measuring instrument Agilent Series 1100/1200; module setup: iso pump, autosampler, thermostat, VW detector, RI detector, degasser; columns PL mixed B/HP mixed B., 3 columns each having a length of 300 mm: column type 79911 GP-MXB, Plgel 10 μm MIXED-B GPC/SEC columns, Agilent Technologies).

The determination of the vinyl content based on the amount of butadiene of the polymers is carried out by means of infrared absorption spectrometry (IR; Morello method, IFS 66 FT-IR spectrometer, Bruker Analytic GmbH, sample preparation by swelling in $CS_2$).

The determination of the styrene content of the polymers is carried out by means of IR, IFS 66 FT-IR spectrometer, Bruker Analytic GmbH, sample preparation by swelling in $CS_2$, determination of the calibration curve, bound styrene content by fixing of the following bands: a) for trans-1,4-polybutadiene units at 966 $cm^{-1}$, b) for cis-1,4-polybutadiene units at 730 $cm^{-1}$, c) for 1,2-polybutadiene units at 910 $cm^{-1}$, and d) for bound styrene ("bonded styrene (styrene aromatic bond)") at 700 $cm^{-1}$. The band heights are normalized according to the appropriate extinction coefficients and summed to 100%. Normalization is carried out by means of $^1H$- and $^{13}C$-NMR. The styrene content was also, as an alternative, determined by means of NMR (Avance 400 ($^1H$=400 MHz; $^{13}C$=100 MHz), Bruker Analytik GmbH).

The determination of the glass transition temperature ($T_g$) of the unvulcanized polymers was carried out by means of dynamic scanning calorimetry (DSC 2920 (TA Instrument)).

The polymer A of the formula I) including the embodiment of the formula II) preferably has a Mooney viscosity (ML1+4, 100° C., in accordance with ASTM D 1646 (2004)) of less than or equal to 150 Mooney units (MU), particularly preferably less than or equal to 120, very particularly preferably less than or equal to 100 and more very particularly preferably from 10 to 100.

At a Mooney viscosity of the polymer A of less than or equal to 100, good processability (for example, heat buildup in the mechanical mixer, dispersion of the filler, extrusion behavior) of the rubber mixture is ensured.

In an advantageous embodiment, the rubber mixture contains 100 phr of the polymer A, that is, it does not contain any further rubber and all other proportions by weight are based on 100% by weight of the polymer A.

In a further advantageous embodiment, the rubber mixture contains from 5 to 99 phr of the polymer A in combination with from 1 to 95 phr of at least one further rubber.

The at least one further rubber is selected from the group consisting of natural polyisoprene, synthetic polyisoprene, butadiene rubber, solution-polymerized styrene-butadiene rubber, emulsion-polymerized styrene-butadiene rubber, liquid rubbers, halobutyl rubber, polynorborne, isoprene-isobutylene copolymer, ethylene-propylene-diene rubber, nitrile rubber, chloroprene rubber, acrylate rubber, fluoro rubber, silicone rubber, polysulfide rubber, epichlorohydrine rubber, styrene-isoprene-butadiene terpolymer, hydrogenated acrylonitrile-butadiene rubber, isoprene-butadiene copolymer, and hydrogenated styrene-butadiene rubber.

The further rubber is preferably at least one diene rubber selected from the group consisting of synthetic polyisoprene, natural polyisoprene (NR), styrene-butadiene rubber, and polybutadiene (BR).

The natural polyisoprene and the synthetic polyisoprene can be of all types known to those skilled in the art.

The further diene rubber is preferably natural polyisoprene. Particularly good processability (extrudibility, mixability, et cetera) of the rubber mixture of the invention is achieved in this way. The styrene-butadiene rubber from the group of the further diene rubbers is, for the purposes of this disclosure, a styrene-butadiene rubber known to the person of ordinary skill in the art.

From 0 to 100 phr, preferably from 0.1 to 80 phr, preferably from 0.1 to 70 phr, of at least one plasticizer can be additionally present in the rubber mixture.

Such plasticizers include all plasticizers known to those skilled in the art, for example, aromatic, naphthenic or paraffinic mineral oil plasticizers such as MES (mild extraction solvate) or TDAE (treated distillate aromatic extract), or rubber-to-liquid oils (RTL) or biomass-to-liquid oils (BTL) or factices or plasticizer resins or liquid polymers (for example, liquid BR), the average molecular weight of which (determined by GPC=gel permeation chromatography, using a method based on BS ISO 11344:2004) is in the range from 500 to 20 000 g/mol. If liquid polymers are used as plasticizers in the rubber mixture, these are not counted as rubber in the calculation of the composition of the polymer matrix.

When mineral oil is used, this is preferably selected from the group consisting of DAE (distillated aromatic extracts), RAE (residual aromatic extracts), TDAE (treated distillated aromatic extracts), MES (mild extracted solvents), and naphthenic oils.

Furthermore, the rubber mixture of the invention can contain conventional additives in customary proportions by weight. These additives include
a) aging inhibitors such as
N-phenyl-N'-(1,3-dimethylbutyl)-p-phenylenediamine (6PPD),
N,N'-diphenyl-p-phenylenediamine (DPPD),
N,N'-ditolyl-p-phenylenediamine (DTPD),
N-isopropyl-N'-phenyl-p-phenylenediamine (IPPD),
2,2,4-trimethyl-1,2-dihydroquinoline (TMQ),
b) activators such as zinc oxide and fatty acids (for example, stearic acid),
c) waxes,
d) resins, in particular tackifying resins,
e) mastication aids such as 2,2'-dibenzamidodiphenyl disulfide (DBD), and
f) processing aids, such as fatty acid salts, for example, zinc soaps, and fatty acid esters and derivatives thereof.

Particularly when using the rubber mixture for the interior components of a tire or an industrial rubber article which come into direct contact with strength bearers present, a suitable adhesion system, often in the form of tackifying resins, is generally additionally added to the rubber mixture.

The proportion by weight of the total amount of further additives is from 3 to 150 phr, preferably from 3 to 100 phr and particularly preferably from 5 to 80 phr.

The total proportion of the further additives includes from 0.1 to 10 phr, preferably from 0.2 to 8 phr, particularly preferably from 0.2 to 4 phr, of zinc oxide (ZnO).

All types of zinc oxide known to those skilled in the art, for example, ZnO granules or powders, are possible here. The zinc oxide conventionally used generally has a BET surface area of less than 10 m²/g. However, it is also possible to use nano-zinc oxide having a BET surface area of from 10 to 60 m²/g.

The vulcanization is optionally carried out in the presence of sulfur and/or sulfur donors and with the aid of vulcanization accelerators, with some vulcanization accelerators simultaneously being able to act as sulfur donors.

Since sulfur which can be liberated is bound in the polymer A of the formula I) including the embodiment of the formula II), all other sulfur-donating compounds are referred to as "further sulfur donors".

Sulfur and/or further sulfur donors and also one or more accelerators are added in the stated amounts to the rubber mixture in the last mixing step. The accelerator is selected from the group consisting of thiazole accelerators, mercapto accelerators, sulfenamide accelerators, thiocarbamate accelerators, thiuram accelerators, thiophosphate accelerators, thiourea accelerators, xanthogenate accelerators, and guanidine accelerators.

Preference is given to using at least one sulfenamide accelerator selected from the group consisting of N-cyclohexyl-2-benzothiazolesulfenamide (CBS), N,N-dicyclohexylbenzothiazol-2-sulfenamide (DCBS), benzothiazyl-2-sulfenomorpholide (MBS), and N-tert-butyl-2-benzothiazylsulfenamide (TBBS).

Further network-forming systems as are obtainable, for example, under the tradenames Vulkuren®, Duralink® or Perkalink® or network-forming systems as are described in WO 2010/059402 A1 can also be used in the rubber mixture. This system contains a vulcanizer which crosslinks with a functionality of greater than four and at least one vulcanization accelerator. The vulcanizer which crosslinks with a functionality of greater than four has, for example, the general formula (1):

$$G[C_aH_{2a}\text{—}CH_2\text{—}S_bY]_c \quad (1)$$

where G is a polyvalent cyclic hydrocarbon group and/or a polyvalent heterohydrocarbon group and/or a polyvalent siloxane group containing from 1 to 100 atoms; where each Y is selected independently from among a rubber-active group containing sulfur-containing functions; and a, b, and c are integers which independently satisfy: a is from 0 to 6; b is from 0 to 8; and c is from 3 to 5.

The rubber-active group is preferably selected from among a thiosulfonate group, a dithiocarbamate group, a thiocarbonyl group, a mercapto group, a hydrocarbon group, and a sodium thiosulfonate group (Bunte salt group).

Very good abrasion and tear properties of the rubber mixture are achieved in this way.

For the purposes of the present disclosure, sulfur and further sulfur donors, including sulfur-donating silanes such as TESPT, and vulcanization accelerators as described above and vulcanizers which crosslink with a functionality of greater than four, as described in WO 2010/059402 A1, for example, a vulcanizer of the formula (1), and also the abovementioned systems Vulkuren®, Duralink® and Perkalink® are subsumed under the term vulcanizer.

Due to the sulfur incorporated in the polymer chains of the polymer A, comparatively small amounts of sulfur in the form of elemental sulfur and/or further sulfur donors are added to the rubber mixture before vulcanization. The required amount of further sulfur in the form of elemental sulfur and/or further sulfur donors depends on the field of use of the respective rubber mixture. The respective amounts to be added are known to those skilled in the art. When elemental sulfur is added, the amounts in the case of a rubber mixture for the heel of vehicle tires are, for example, from 0 to 5 phr. In the case of treads of vehicle tires, which generally have a lower sulfur content than the heel, the amount of elemental sulfur to be added is preferably from 0.1 to 1 phr, particularly preferably from 0.1 to 0.5 phr.

In one embodiment, it is conceivable for no elemental sulfur and no further sulfur donor, that is, 0 phr of sulfur and 0 phr of further sulfur donor, to be added.

In a further embodiment, a plurality of accelerators are added. Preference is given to using a sulfenamide accelerator, particularly preferably CBS, in combination with the guanidine accelerator DPG (diphenylguanidine). The amount of DPG is from 0 to 5 phr, preferably from 0.1 to 3 phr, particularly preferably from 0.5 to 2.5 phr, very particularly preferably from 1 to 2.5 phr.

In addition, vulcanization retarders can be present in the rubber mixture.

The production of the rubber mixture is carried out by processes which are customary in the rubber industry and in which a base mixture comprising all constituents apart from the vulcanization system (sulfur and vulcanization-influencing substances) is firstly produced in one or more mixing stages. The finished mixture is produced by addition of the vulcanization system in a final mixing stage. The finished mixture is processed further by, for example, an extrusion operation and brought to the appropriate shape.

It is a further object of the invention to provide a vehicle tire which, compared to the prior art, has optimized abrasion properties and improved rolling resistance behavior, without other relevant properties such as wet braking and/or dry braking and/or the tearing properties being adversely affected to a significant extent.

This object is achieved by the vehicle tire containing at least one rubber mixture according to the disclosure as described above in at least one component. Here, the disclosure relating to the vehicle tire encompasses all abovementioned examples, embodiments and further developments of the rubber mixture of the disclosure.

The tire is preferably a pneumatic vehicle tire.

It is a further object of the disclosure to optimize the abrasion properties and the rolling resistance behavior of vehicle tires without other relevant properties such as wet braking and/or dry braking and/or the tearing properties being adversely affected to a significant extent.

This object is achieved by the use of the above-described rubber mixture for producing vehicle tires. Here, the disclosure encompasses all abovementioned examples, embodiments and further developments of the rubber mixture of the disclosure.

The tire is preferably a pneumatic vehicle tire.

For use in vehicle tires, the mixture is preferably brought into the shape of a tread and applied in a known manner in the production of the vehicle tire blank. However, the tread can also be rolled up in the form of a narrow strip of rubber mixture on to a tire blank. In the case of two-part treads (upper part: cap and lower part: base), the rubber mixture of the invention can be used both for the cap and for the base.

The production of the rubber mixture of the invention for use as body mixture in vehicle tires is carried out as described above for the tread. The difference lies in the shaping after the extrusion operation. The resulting shapes of the rubber mixture of the invention for one or more different body mixtures then serve for building up a tire blank.

DESCRIPTION OF THE PREFERRED EMBODIMENTS OF THE INVENTION

The disclosure will now be illustrated with the aid of comparative examples and working examples which are summarized in Table 1. The mixtures denoted by "I" are here mixtures according to the disclosure, while the mixtures denoted by "C" are comparative mixtures.

In the case of all the examples of mixtures in the table, the amounts indicated are parts by weight based on 100 parts by weight of total rubber (phr) or on 100 parts by weight of silica (phf).

The production of the mixture was carried out under conventional conditions in two stages in a laboratory tangential mixer. The rubber mixture I1 has 100 phr of the polymer A in the embodiment having the above-described formula II). In the case of the rubber mixture C1, a comparative polymer C of the formula III), which compared to the polymer A of the formula I) used by way of example has a comparable molecular weight, a comparable vinyl content and a comparable styrene content and likewise polymer sections of SBR which, however, are linked to one another via silicon atoms instead of an $S_x$ group, was used instead of a polymer of the formula I) or II). These polymer sections of the comparative polymer do not have any sulfur-vulcanizable end groups.

In addition, a similar hardness (Shore A at room temperature) was set in the case of the rubber mixture I1 by adapting the amounts of sulfur and accelerator.

Test specimens were produced from all mixtures by vulcanization, and materials properties typical for the rubber industry were determined using these test specimens. The following test methods were employed for the above-described tests on test specimens:

Shore A hardness (unit Shore A, abbreviated as ShA) at room temperature (RT) in accordance with DIN 53 505

Rebound resilience (rebound for short) at room temperature (RT) and 70° C. in accordance with DIN 53 512

Stress values at 300% elongation (modulus 300) at room temperature (RT) in accordance with DIN 53 504

Tensile strength and elongation at break at room temperature in accordance with DIN 53 504

Abrasion at room temperature in accordance with DIN53 516 or DIN/ISO 4649

Glass transition temperature $T_g$ of the rubber mixture from loss factor tan δ (tangent delta) from dynamic-mechanical measurement in accordance with DIN 53 513 (temperature sweep)

Maximum loss factor tan δ (max) from dynamic-mechanical measurement in accordance with DIN 53 513 (temperature sweep)

TABLE 1

| Constituents | Unit | C1 | I1 |
| --- | --- | --- | --- |
| Polymer A [a)] | phr | — | 100 |
| Polymer C [b)] | phr | 100 | — |
| Silica [c)] | phr | 95 | 95 |
| TDAE | phr | 3.5 | 3.5 |
| Aging inhibitor | phr | 4 | 4 |
| Stearic acid | phr | 2.5 | 2.5 |
| Zinc oxide | phr | 2.5 | 2.5 |
| Silane | phf | 7.2 | 7.2 |
| Accelerator DPG | phr | 2 | 2 |
| Accelerator CBS | phr | 3.6 | 2.7 |
| Sulfur | phr | 0.36 | 0.27 |
| Physical properties | | | |
| Shore hardness at RT | Shore A | 64 | 65 |
| Rebound resilience at RT | % | 14 | 15 |
| Rebound resilience at 70° C. | % | 28 | 37 |
| Diff. in the rebound resilience (70° C.-RT) | | 14 | 22 |
| Tensile strength | MPa | 6 | 8 |

TABLE 1-continued

| Constituents | Unit | C1 | I1 |
| --- | --- | --- | --- |
| Elongation at break | % | 582 | 645 |
| Modulus 300 | MPa | 3.5 | 4.0 |
| Tan δ (max) | | 0.276 | 0.246 |
| Tg from tan δ | ° C. | −2 | −5 |
| Abrasion | mm³ | 343 | 317 |

Substances used from Table 1:
[a)] Polymer A: sulfur-modified SSBR of the formula II) below:
II) F—(SBR—Y—SBR—$S_x$)$_z$—SBR—Y—SBR—F
where: $T_g$ = −16.3° C.; Mooney viscosity = 94.3 MU; vinyl content = 68.1% by weight; styrene content = 21.6% by weight; sulfur content = 1.3 g/kg of polymer; $M_w$ = 463 kg/mol; $M_n$ = 194 kg/mol; produced from: 14.35 mmol of the diinitiator 1,3-phenylenebis(3-methyl-1-(4-methyl)phenylpentylidene)bislithium of the formula II); 10.99 mmol of $S_2Cl_2$; 10.48 mol of butadiene; 1.452 mol of styrene; 7.158 mmol of TMEDA (N,N,N′,N′-tetramethylethane-1,2-diamine)
[b)] Polymer C: Comparative polymer of the formula III) below

where: Me = methyl group; Tg = −16.4° C.; Mooney viscosity = 32.6 MU; vinyl content = 67.5% by weight; styrene content = 21.6% by weight; sulfur content = 0 g/kg of polymer; MM = 323 kg/mol, $M_n$ = 102 kg/mol; produced from: 9.046 mmol of the diinitiator of the formula II); 6.732 mmol of Me$_2$SiCl$_2$; 6.559 mol of butadiene; 0.911 mol of styrene; 4.605 mmol of TMEDA; the wavy lines represent SBR copolymer units.
[c)] Silica: ULTRASIL ® VN3, from Evonik As can be seen from Table 1, the rubber mixture I1 according to the disclosure displays, compared to the comparative mixture C1, a significantly higher value for the rebound resilience at 70° C. at virtually the same glass transition temperature, which is an indication of a significantly improved rolling resistance behavior of the rubber mixture of the disclosure compared to the comparative mixture C1. In addition, the rubber mixture I1 of the disclosure displays improved abrasion behavior and an increased tensile strength.

At the same time, the other physical properties remain at virtually the same level. In particular, the difference in the rebound resiliences of I1 is significantly increased compared to C1, which indicates that I1 is superior in respect of the conflicting targets of rolling resistance and wet grip.

The rubber mixture of the invention thus makes it possible, particularly by use in treads, to achieve a further improvement in the rolling resistance and the abrasion resistance of vehicle tires based on the prior art without the other tire properties being adversely affected.

It is understood that the foregoing description is that of the preferred embodiments of the invention and that various changes and modifications may be made thereto without departing from the spirit and scope of the invention as defined in the appended claims.

What is claimed is:
1. A rubber mixture, comprising:
from 5 to 100 phr of at least one polymer A of the formula I) below:

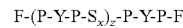

F-(P-Y-P-$S_x$)$_z$-P-Y-P-F      I)

where
S is a sulfur atom;
P is an elastomeric polymer chain which has been obtained by anionic polymerization of at least one conjugated diene and, optionally, at least one vinylaromatic compound, in the presence of a diinitiator;
Y is a dicarbanion group derived from the diinitiator;
x is independently for each $S_x$ group an integer equal to or greater than 1, with the proviso that x is selected from among the numbers 2, 3, and 4 for at least one $S_x$ group;
z is an integer from 1 to 160;

each F is independently an end group selected from the group consisting of —H, —SH, —SOH, —SCl, —SSCl, —SO$_2$H, and —SO$_3$H; and, at least one filler.

2. The rubber mixture as claimed in claim 1, wherein the at least one conjugated diene is selected from the group consisting of 1,3-butadiene, isoprene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, and 1,3-cyclooctadiene.

3. The rubber mixture as claimed in claim 2, wherein the at least one conjugated diene is 1,3-butadiene.

4. The rubber mixture as claimed in claim 1, wherein the vinylaromatic compound is selected from the group consisting of styrene, 2-methylstyrene, 3-methylstyrene, 4-methylstyrene, 2,4-dimethylstyrene, 2,4,6-trimethylstyrene, alpha-methylstyrene, 2,4-diisopropylstyrene, 4-tert-butylstyrene, stilbene, vinylbenzyldimethylamine, 4-vinylbenzyl dimethylaminoethyl ether, N,N-dimethylaminoethylstyrene, tert-butoxystyrene, vinylpyridine, 1,2-divinylbenzene, 1,3-divinylbenzene, and 1,4-divinylbenzene.

5. The rubber mixture as claimed in claim 4, wherein the vinylaromatic compound is styrene.

6. The rubber mixture as claimed in claim 1, wherein the polymer A has the formula II) below:

F-(SBR-Y-SBR-S$_x$)$_z$-SBR-Y-SBR-F,  II)

where

S is a sulfur atom;

SBR is an elastomeric polymer chain which has been obtained by anionic polymerization of 1,3-butadiene and styrene in the presence of a diinitiator;

Y is a dicarbanion group derived from the diinitiator;

x is independently for each S$_x$ group an integer equal to or greater than 1, with the proviso that x is selected from among the numbers 2, 3 and 4 for at least one S$_x$ group;

z is an integer from 1 to 160; and each F is independently an end group selected from the group consisting of —H, —SH, —SOH, —SCl, —SSCl, —SO$_2$H, and —SO$_3$H.

7. The rubber mixture as claimed in claim 1, wherein the diinitiator is at least one organolithium compound.

8. The rubber mixture as claimed in claim 1, wherein the polymer A has a sulfur content of from 0.1 to 30 g per kg of polymer.

9. The rubber mixture as claimed in claim 1, wherein the filler is at least one silica and/or at least one carbon black.

10. A vehicle tire, comprising at least one rubber mixture as claimed in claim 1 in at least one component of the vehicle tire.

* * * * *

UNITED STATES PATENT AND TRADEMARK OFFICE
CERTIFICATE OF CORRECTION

PATENT NO. : 9,701,809 B2
APPLICATION NO. : 15/185485
DATED : July 11, 2017
INVENTOR(S) : Herzog et al.

It is certified that error appears in the above-identified patent and that said Letters Patent is hereby corrected as shown below:

In the Specification

In Column 14:
Line 21: delete "MM=323 kg/mol" and insert -- $M_w$=323 kg/mol -- therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*